(12) United States Patent
Thomas, III et al.

(10) Patent No.: US 11,836,304 B2
(45) Date of Patent: Dec. 5, 2023

(54) DIGITAL PEN SENSOR SURFACE

(71) Applicant: HEWLETT-PACKARD DEVELOPMENT COMPANY, L.P., Spring, TX (US)

(72) Inventors: Fred Charles Thomas, III, Fort Collins, CO (US); Paul Mazurkiewicz, Fort Collins, CO (US); Bruce Eric Blaho, Fort Collins, CO (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/922,541

(22) PCT Filed: Apr. 30, 2020

(86) PCT No.: PCT/US2020/030773
§ 371 (c)(1),
(2) Date: Oct. 31, 2022

(87) PCT Pub. No.: WO2021/221669
PCT Pub. Date: Nov. 4, 2021

(65) Prior Publication Data
US 2023/0205328 A1 Jun. 29, 2023

(51) Int. Cl.
*G06F 3/0354* (2013.01)
*G06F 3/044* (2006.01)
*G06F 3/041* (2006.01)

(52) U.S. Cl.
CPC ........ *G06F 3/03545* (2013.01); *G06F 3/0442* (2019.05)

(58) Field of Classification Search
USPC .......................................................... 345/179
See application file for complete search history.

(56) References Cited

U.S. PATENT DOCUMENTS

| 8,450,628 | B2* | 5/2013 | Yau ...................... G06F 3/0443 |
| | | | 200/600 |
| 8,878,811 | B1 | 11/2014 | Baumbach |
| 9,046,961 | B2 | 6/2015 | King et al. |
| 9,665,200 | B2 | 5/2017 | Filiz et al. |
| 10,088,940 | B1* | 10/2018 | Dabell ................. G06F 3/0488 |
| 10,120,498 | B2 | 11/2018 | Gray |
| 10,423,273 | B2 | 9/2019 | Leigh et al. |
| 2005/0127972 | A1* | 6/2005 | Chen ................... H01L 27/0682 |
| | | | 257/532 |

(Continued)

FOREIGN PATENT DOCUMENTS

WO 2014/065000 A1 5/2014

*Primary Examiner* — Chineyere D Wills-Burns
(74) *Attorney, Agent, or Firm* — Knobbe, Martens, Olson & Bear, LLP (57) ABSTRACT

An example electronic device includes an active digital pen sensor surface to generate analog position information, wherein the active digital pen sensor surface includes a projective capacitive sensor layer with a variance of sheet resistance of less than plus or minus 20 percent. The electronic device also includes a controller, including a sigma-delta analog-to-digital (A-to-D) converter, to generate digital pen position information based on the analog position information, and perform a triangulation based on the digital pen position information to determine a pen position.

15 Claims, 5 Drawing Sheets

(56) References Cited

U.S. PATENT DOCUMENTS

| | | | | |
|---|---|---|---|---|
| 2011/0102331 A1* | 5/2011 | Philipp | ................... | G06F 3/047 |
| | | | | 345/173 |
| 2013/0082970 A1* | 4/2013 | Frey | ...................... | H01H 65/00 |
| | | | | 345/173 |
| 2014/0368455 A1* | 12/2014 | Croisonnier | ............ | G06F 3/045 |
| | | | | 345/173 |
| 2015/0277623 A1* | 10/2015 | Nakamura | ............ | G06F 3/0445 |
| | | | | 345/174 |
| 2016/0162077 A1* | 6/2016 | Kiyoshi | ................... | C09D 5/24 |
| | | | | 345/174 |
| 2016/0253003 A1* | 9/2016 | Barton | ................. | H03K 17/962 |
| | | | | 345/174 |
| 2017/0068340 A1* | 3/2017 | Zimmerman | ......... | G06F 3/0414 |
| 2017/0164462 A1* | 6/2017 | Gao | ...................... | C23C 28/021 |
| 2017/0322674 A1* | 11/2017 | Rosenberg | .......... | G06F 3/04166 |
| 2019/0064971 A1* | 2/2019 | Ishizaki | ................ | G06F 3/0412 |
| 2021/0391253 A1* | 12/2021 | Yang | ....................... | H01L 27/01 |

\* cited by examiner

DIGITAL PEN SENSOR SURFACE

BACKGROUND

Some computing devices employ touch-based input methods that allow a user to physically touch, for example, an associated display, and have that touch registered as an input at the particular touch location, thereby enabling a user to interact physically with objects shown on the display of the computing device. Digital pens may also be used in conjunction with computing devices and provide a natural and intuitive way for users to input information into applications running on the computing devices.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples disclosed herein are directed to a device that includes at least one active digital pen sensor surface having a projective capacitive (p-cap) sensor layer with a high sheet resistance and a low variance of sheet resistance, and an analog-to-digital (A-to-D) sampling controller. Sheet resistance is a measure of resistance of thin films that are nominally uniform in thickness. Sheet resistance is a special case of resistivity for a uniform sheet thickness. The units for sheet resistance are ohms per square. A "high" sheet resistance as used herein means a sheet resistance of at least 200 ohms/sq. A "low" variance of sheet resistance as used herein means a variance of sheet resistance of less than plus or minus 5%. A triangulation method may be used to determine pen tip location from a trace crossing nearest a pen tip point of contact and additional trace crossings surrounding the point of contact. An active digital pen according to an example is a digital pen that emits electric field umbra from the tip of the pen that will impact the capacitance of more than one capacitive sensor node in close proximity to the active pen's tip. This is in contrast to a passive digital pen that emits no electric field and just acts as a highly localized ground path for capacitive nodes in direct proximity to its tip.

The sensor surface may be fabricated from or comprise a projective capacitive (p-cap) poly(3,4-ethylenedioxythiophene) (PEDOT) film. The PEDOT film is an optically clear, electrically-conductive layer that may be fabricated into a row and column p-cap sensor array, and that may be formed on a clear plastic layer (e.g., polyethylene terephthalate (PET)). The PEDOT film may be impedance-conditioned or etched with p-cap array sensors to enable touch and pen interactions on their surfaces. Some example PEDOT films have a high sheet resistance (e.g., about 225 ohms/sq), and a low variance of sheet resistance (e.g., about plus or minus 1% to 3%) over the entire film. The processing of the PEDOT film to form the p-cap sensor array may raise the sheet resistance of the PEDOT film p-cap row and column traces to 400 ohms/sq or higher. In contrast, examples of indium-tin-oxide (ITO) on plastic have a sheet resistance of about 150 ohms/sq, and a variance of sheet resistance of about plus or minus 25%. Examples of silver nanowire have a sheet resistance of about 20 ohms/sq, and a variance of sheet resistance of about plus or minus 40%.

The A-to-D sampling controller may be a sigma-delta A-to-D sampling controller that has drive and sense electrodes operated in parallel and that aggressively filters out noise from the measured voltage-based capacitive signals. In some examples, the sigma-delta controller is able to image a single sensor surface at between 100 and 600 frames per second.

PEDOT based p-cap optically clear sensors may have a higher sheet resistance (and hence signal noise limitations) than sensors based on other materials, such as ITO, silver nanowire, metal mesh, and carbon nano-tube, but have a much lower variance in sheet resistance than the other materials. The sigma-delta A-to-D sampling controller is able to filter out this noise, which allows a material, such as PEDOT, with a low variance in sheet resistance, to be used effectively. Once the electronic noise in the system is reduced by the sigma-delta A-to-D sampling, the variance in sheet resistance of the sensor layer becomes the largest source of pen location inaccuracy for the triangulation method of pen tip location. Thus, the use of a material with a low variance in sheet resistance, such as PEDOT, provides for higher pen location accuracy and more repeatable pen tip location results than other materials, for example.

Figure 1:
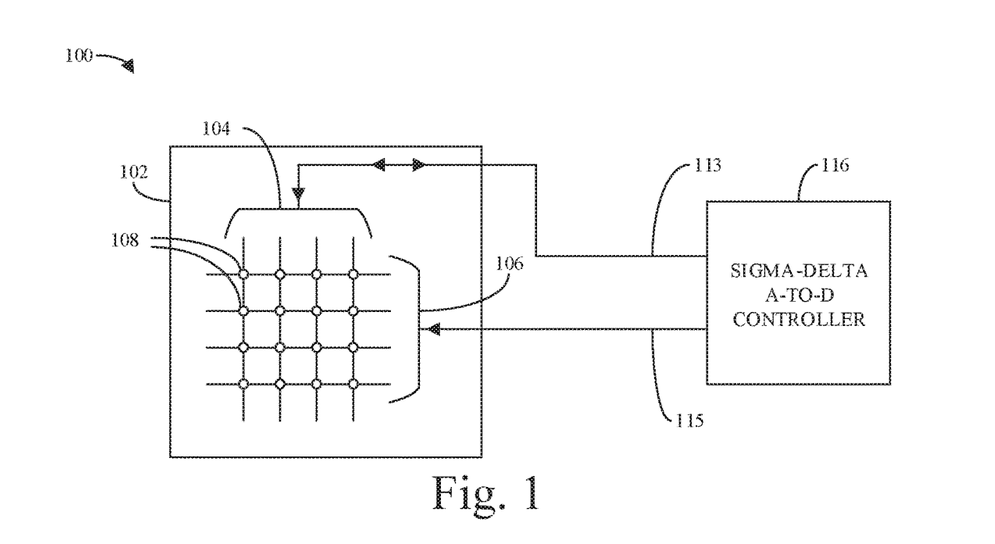
FIG. 1 is a diagram illustrating an active digital pen sensor system according to an example.

FIG. 1 is a diagram illustrating an active digital pen sensor system 100 according to an example. System 100 includes electronic device 102 and sigma-delta analog-to-digital (A-to-D) controller 116. In an example, electronic device 102 is a display device with an active digital pen sensor surface.

Device 102 includes a plurality of sense electrodes 104, a plurality of drive electrodes 106, and a plurality of capacitive nodes 108. The sense electrodes 104 are conductive traces represented by a plurality of equally spaced vertical lines, and the drive electrodes 106 are conductive traces represented by a plurality of equally spaced horizontal lines. The intersections of the sense electrodes 104 and the drive electrodes 106 correspond to the locations of the capacitive nodes 108.

The sense electrodes 104 and drive electrodes 106 may be used to sense the position of an active digital pen. In some examples, the sense electrodes 104 and drive electrodes 106 are about 3-5 mm wide, with a pitch of about the same or a little wider (e.g., 4-6 mm). Sensing of position of an active digital pen with a fine tip (e.g., about 0.5 mm to 2 mm diameter or less) may involve triangulation of tip location using multiple signals from the trace intersections closest to the pen tip point touch down location, and other trace crossings surrounding the touch down location.

The sense electrodes 104 are coupled via communication link 113 to controller 116 to provide sense signals to the controller 116. In an example, communication link 113 includes a separate conductive line for each of the sense electrodes 104. The drive electrodes 106 are coupled via communication link 115 to controller 116 to provide drive signals from the controller 116 to the drive electrodes. In an example, communication link 115 includes a separate conductive line for each of the drive electrodes 106.

Figure 2:
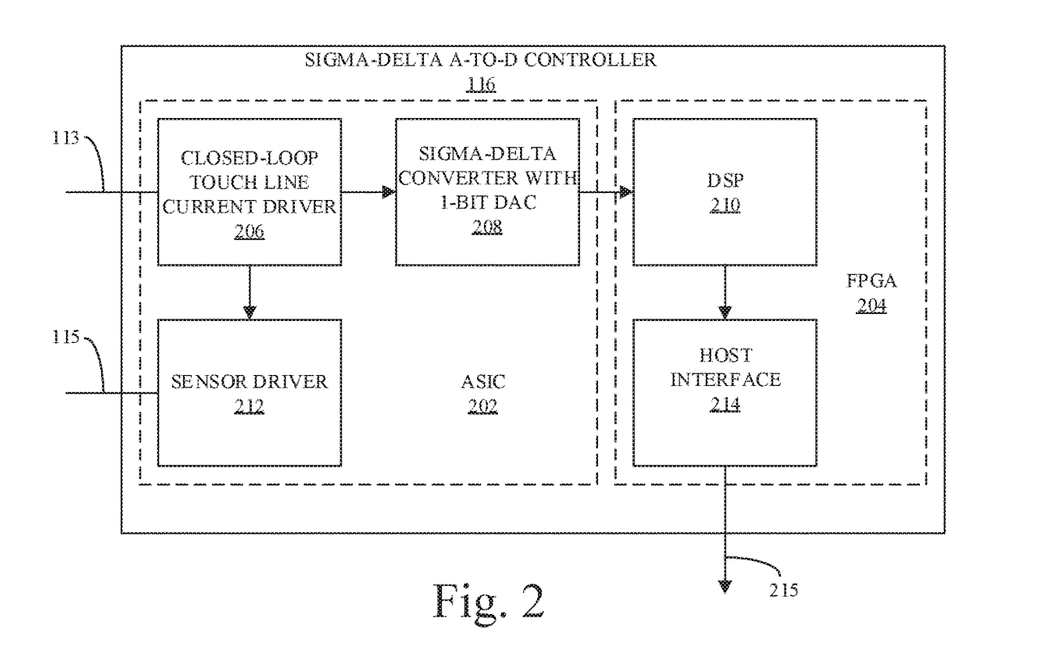
FIG. 2 is a block diagram illustrating elements of the sigma-delta analog-to-digital controller shown in FIG. 1 according to an example.

In some examples, device 102 may include a p-cap PEDOT film with rows, and a p-cap PEDOT film with columns, with these films being on opposite sides of a plastic or glass film. FIG. 2 is a block diagram illustrating elements of the sigma-delta analog-to-digital (A-to-D) controller 116 shown in FIG. 1 according to an example. In an example, controller 116 includes a hybrid analog/digital application specific integrated circuit (ASIC) 202 and a digital field programmable gate array (FPGA) 204. ASIC 202 includes closed-loop touch line current driver 206, sigma-delta converter with 1-bit digital to analog converter (DAC) 208, and sensor driver 212. FPGA 204 includes digital signal processor (DSP) 210 and host interface 214. In an example, ASIC 202 is an analog front-end (AFE) with a data rate of about 300 to 600 frames per second (i.e., 300 to 600 Hz), and ASIC 202 drives and reads up to 64 channels in parallel.

Closed-loop touch line current driver 206 is coupled to sensor driver 212 to facilitate the generation of drive signals. Sensor driver 212 outputs analog drive signals via communication link 115. The closed-loop drive current on each electrode supports long electrodes and electrode variability. In some examples, the drive signals provide increased channel isolation and noise suppression.

Closed-loop touch line current driver 206 receives analog sense signals via communication link 113 and provides the analog sense signals to sigma-delta converter 208. In some examples, the driving and sensing of each electrode occurs individually and in parallel. Sigma-delta converter 208 performs a delta-sigma modulation process and converts the analog sense signals into digital sense signals, which are output to DSP 210.

In some examples, sigma-delta converter 208 encodes analog signals using high-frequency delta-sigma modulation, and then applies a digital filter to form a higher-resolution but lower sample-frequency digital output. Delta-sigma modulation involves delta modulation in which the change in the signal (i.e., its delta) is encoded, resulting in a stream of pulses. Accuracy of the modulation may be improved by passing the digital output through a 1-bit DAC and adding (sigma) the resulting analog signal to the input signal (the signal before delta modulation), thereby reducing the error introduced by the delta modulation.

DSP 210 performs filtering of the digital sense signals received from sigma-delta converter 208, and touch/pen image extraction. DSP 210 provides full touch/pen images to host interface 214. In some examples, DSP 210 also performs touch/pen processing (e.g., finger/pen coordinates, palm rejection, gesture interpretation, etc.). In an example, host interface 214 outputs the full touch/pen images via a communication link 215 or conversely it provides touch/pen coordinate information universal serial bus (USB)/inter-integrated circuit (I2C) human interface device (HID) packets to a host device. In some cases, host interface 214 may provide both touch image as well as USB/I2C HID packets to a host device.

Figure 3:
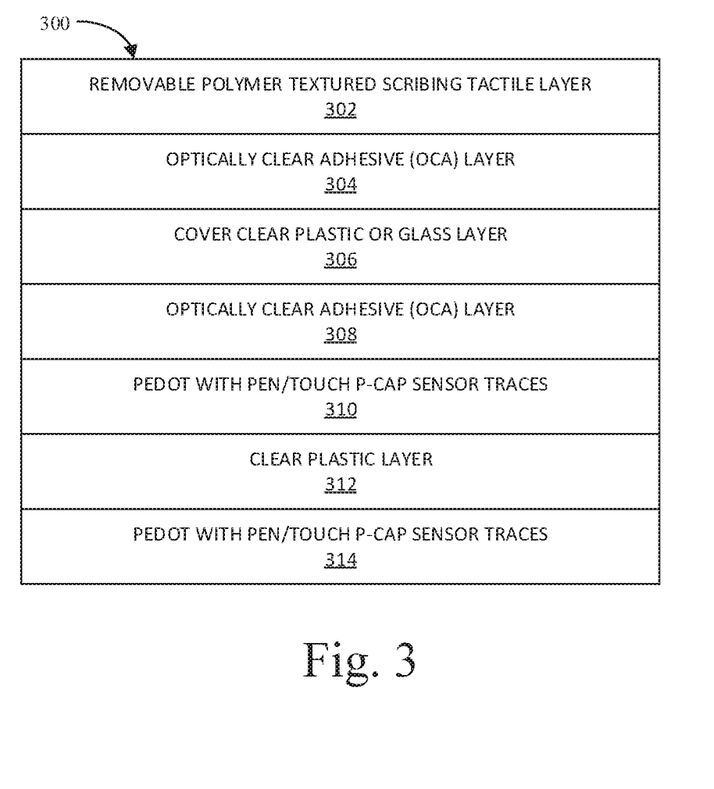
FIG. 3 is a layer diagram illustrating layers of an active digital pen sensor according to an example.

FIG. 3 is a layer diagram illustrating layers of an active digital pen sensor 300 according to an example. Sensor 300 includes removable polymer textured scribing tactile layer 302, optically clear adhesive (OCA) layer 304, cover clear plastic or glass layer 306, OCA layer 308, PEDOT with pen/touch p-cap sensor traces layer 310, clear plastic layer 312, and PEDOT with pen/touch p-cap sensor traces layer 314. In an example, layer 302 has a thickness of 75 um, layer 304 has a thickness of 50 um, layer 306 has a variable thickness; layer 308 has a thickness of 50 um, layer 310 has a thickness of 0.1 um to 0.5 um, layer 312 has a thickness of 100 um, and layer 314 has a thickness of 0.1 um to 0.5 um.

Layers 310, 312, and 314 represent a p-cap sensor stack. In some examples, the drive conductive traces (i.e., drive electrodes) for the sensor stack are in layer 310, and the sense conductive traces (i.e., sense electrodes) for the sensor stack are in layer 314. The PEDOT layers 310 and 314, are clear, electrically-conductive layers that are fabricated into row and column p-cap sensor arrays, which are formed on a clear plastic layer (e.g., polyethylene terephthalate (PET)), such as layer 312. The fabrication process may include increasing the surface resistance of portions/areas of the PEDOT film by orders of magnitude via wet-printing of the PEDOT film with a chemical agent. In contrast, fabrication processes for other materials typically involve adding trace material to the layer or etching material off the layer. Compared to other materials that have been used for touch/pen sensor surfaces, example PEDOT films are less expensive, have a lower index of refraction, are more flexible/bendable, and have a lower variance in sheet resistance across the layer, which is typically about plus or minus one to three percent. Example PEDOT films have an index of refraction of 1.5. In contrast, example ITO films have an index of refraction of 2.1. The highly uniform sheet resistance (e.g., a variance in sheet resistance of less than plus or minus 5%) of the PEDOT layer translates into nodes having a more uniform capacitance over the layer than materials with a higher variance in sheet resistance (e.g., higher than plus or minus 5%).

Figure 4:
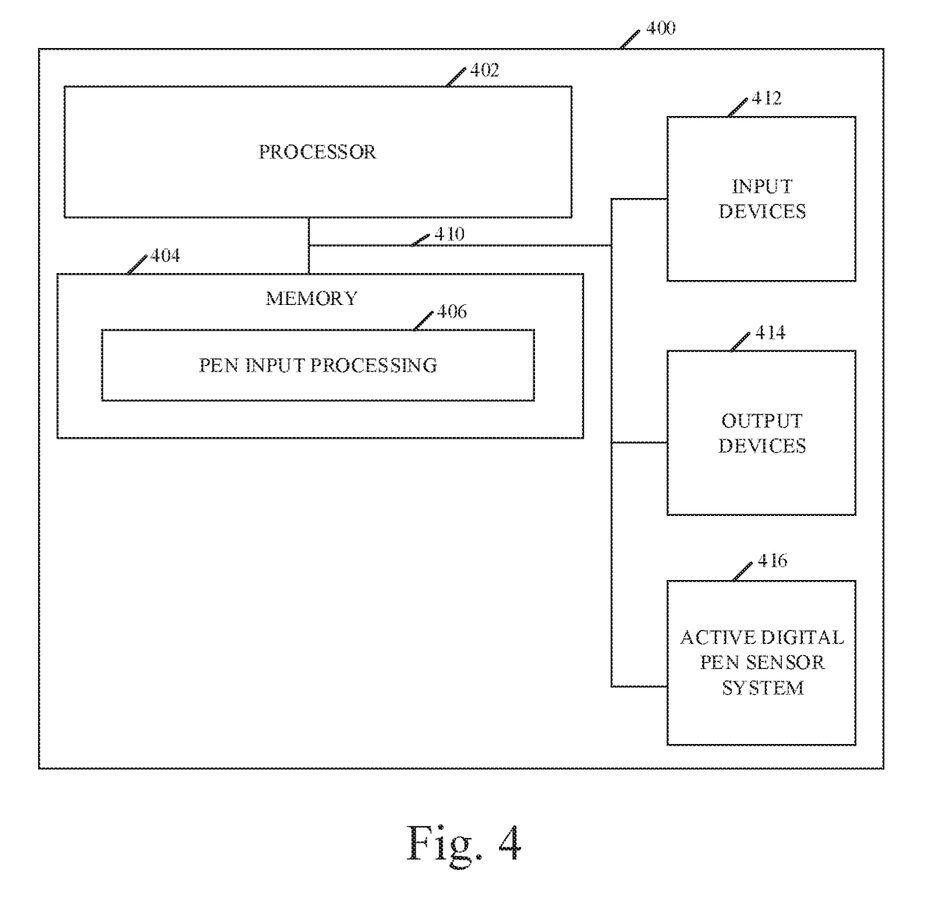
FIG. 4 is a block diagram illustrating a computing system with an active digital pen sensor system according to an example.

FIG. 4 is a block diagram illustrating a computing system 400 with an active digital pen sensor system according to an example. System 400 includes processor 402, memory 404, input devices 412, output devices 414, and active digital pen sensor system 416. Processor 402, memory 404, input devices 412, output devices 414, and active digital pen sensor system 416 are communicatively coupled to each other through communication link 410. In an example, sensor system 416 may be implemented with the sensor system 100 shown in FIG. 1. Sensor system 416 represents an active digital pen enabled interface that enables pen-based interaction between a user and a display, or between a user and an indirect inking device or some other pen-based device.

Processor 402 includes a central processing unit (CPU) or another suitable processor. In an example, memory 404 stores machine readable instructions executed by processor 402 for operating system 400. Memory 404 includes any suitable combination of volatile and/or non-volatile memory, such as combinations of Random-Access Memory (RAM), Read-Only Memory (ROM), flash memory, and/or other suitable memory. These are examples of non-transitory computer readable media (e.g., non-transitory computer-readable storage media storing computer-executable instructions that when executed by at least one processor cause the at least one processor to perform a method). The memory 404 is non-transitory in the sense that it does not encompass a transitory signal but instead is made up of at least one memory component to store machine executable instructions for performing techniques described herein.

Memory 404 stores pen input processing module 406. Processor 402 executes instructions of pen input processing module 406 to perform techniques described herein.

Input devices 412 include a keyboard, mouse, data ports, stylus or active digital pen, and/or other suitable devices for inputting information into system 400. Output devices 414 include speakers, data ports, and/or other suitable devices for outputting information from system 400.

Active digital pen sensor system 416 may track the position of an active digital pen on a display or other electronic device and output corresponding pen position information to pen input processing module 406 for processing.

Figure 5:
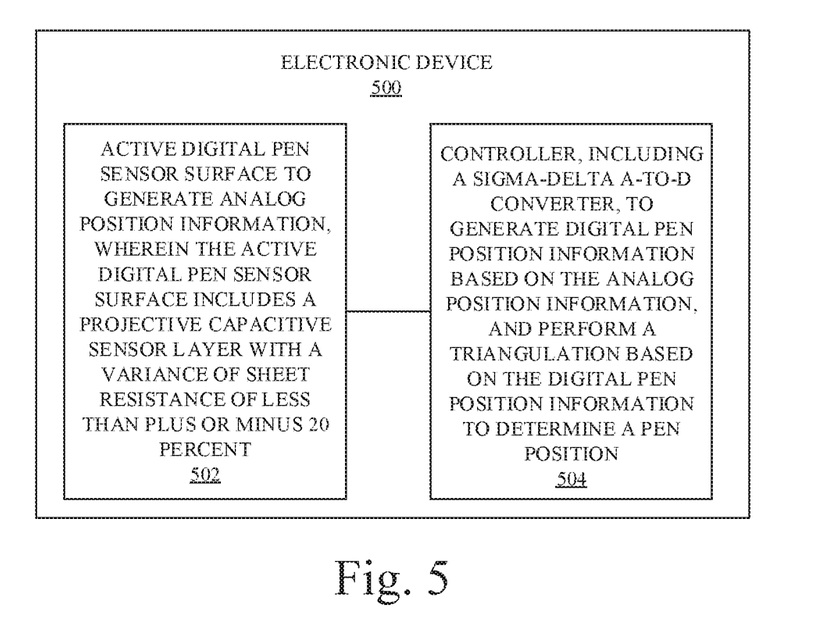
FIG. 5 is a block diagram illustrating an electronic device according to an example.

An example is directed to an electronic device. FIG. 5 is a block diagram illustrating an electronic device 500 according to an example. In some examples, electronic device 500 may be a display device. Electronic device 500 includes an active digital pen sensor surface 502 to generate analog position information, wherein the active digital pen sensor surface includes a projective capacitive sensor layer with a variance of sheet resistance of less than plus or minus 20 percent. Electronic device 500 also includes a controller 504, including a sigma-delta analog-to-digital (A-to-D) converter, to generate digital pen position information based on the analog position information, and perform a triangulation based on the digital pen position information to determine a pen position.

The projective capacitive sensor layer may have a variance of sheet resistance of less than plus or minus 10 percent. The projective capacitive sensor layer may have a variance of sheet resistance of less than plus or minus 3 percent. The projective capacitive sensor layer may have a sheet resistance of at least an average of 200 ohms/sq. The projective capacitive sensor layer may have a sheet resistance of at least an average of 400 ohms/sq.

The projective capacitive sensor layer may be fabricated from poly(3,4-ethylenedioxythiophene) (PEDOT) film. The active digital pen sensor surface 502 may include a first projective capacitive PEDOT film with rows of electrodes stacked over a second projective capacitive PEDOT film with columns of electrodes. The triangulation may include using a signal from a trace intersection of the active digital pen sensor surface 502 closest to a pen tip touch down location, and signals from other trace intersections surrounding the touch down location.

Figure 6:
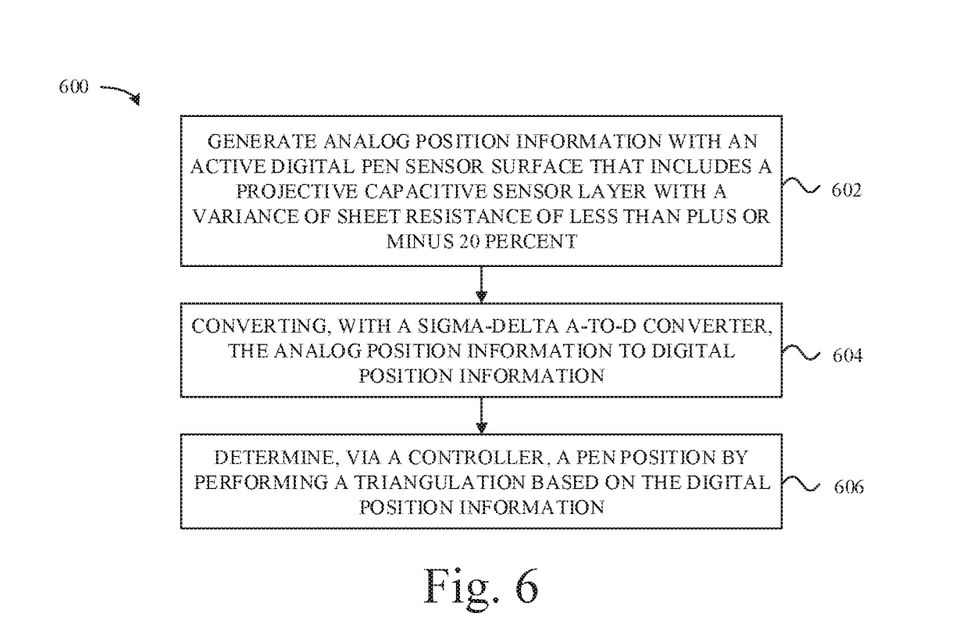
FIG. 6 is a flow diagram illustrating a method of sensing position according to an example.

Another example is directed to a method of sensing position. FIG. 6 is a flow diagram illustrating a method 600 of sensing position according to an example. At 602, the method 600 includes generating analog position information with an active digital pen sensor surface that includes a projective capacitive sensor layer with a variance of sheet resistance of less than plus or minus 20 percent. At 604, the method 600 includes converting, with a sigma-delta analog-to-digital (A-to-D) converter, the analog position information to digital position information. At 606, the method 600 includes determining, via a controller, a pen position by performing a triangulation based on the digital position information.

The projective capacitive sensor layer in method 600 may have a variance of sheet resistance of less than plus or minus 5 percent. The projective capacitive sensor layer in method 600 may have a sheet resistance of at least an average of 300 ohms/sq. The projective capacitive sensor layer in method 600 may be fabricated from poly(3,4-ethylenedioxythiophene) (PEDOT) film.

Figure 7:
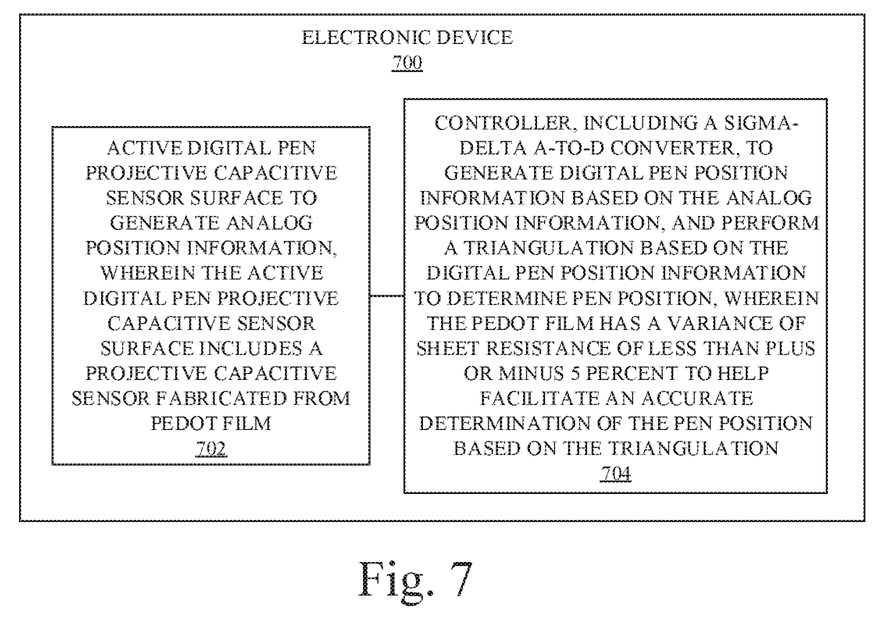
FIG. 7 is a block diagram illustrating an electronic device according to another example.

Another example is directed to an electronic device. FIG. 7 is a block diagram illustrating an electronic device 700 according to another example. Electronic device 700 includes an active digital pen projective capacitive sensor surface 702 to generate analog position information, wherein the active digital pen projective capacitive sensor surface includes a projected capacitive sensor fabricated from poly(3,4-ethylenedioxythiophene) (PEDOT) film. Electronic device 700 also includes a controller 704, including a sigma-delta analog-to-digital (A-to-D) converter, to generate digital pen position information based on the analog position information, and perform a triangulation based on the digital pen position information to determine a pen position, wherein the PEDOT film has a variance of sheet resistance of less than plus or minus 5 percent to help facilitate an accurate determination of the pen position based on the triangulation. In some examples, electronic device 700 may be a display device. In other examples, the electronic device 700 may be an indirect inking device.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An electronic device, comprising:
   an active digital pen sensor surface to generate analog position information, wherein the active digital pen sensor surface includes a projective capacitive sensor layer with a variance of sheet resistance of less than plus or minus 20 percent; and
   a controller, including a sigma-delta analog-to-digital (A-to-D) converter, to generate digital pen position information based on the analog position information, and perform a triangulation based on the digital pen position information to determine a pen position.

2. The electronic device of claim 1, wherein the projective capacitive sensor layer has a variance of sheet resistance of less than plus or minus 10 percent.

3. The electronic device of claim 1, wherein the projective capacitive sensor layer has a variance of sheet resistance of less than plus or minus 3 percent.

4. The electronic device of claim 1, wherein the projective capacitive sensor layer has a sheet resistance of at least an average of 200 ohms/sq.

5. The electronic device of claim 1, wherein the projective capacitive sensor layer has a sheet resistance of at least an average of 400 ohms/sq.

6. The electronic device of claim 1, wherein the projective capacitive sensor layer is fabricated from poly(3,4-ethylenedioxythiophene) (PEDOT) film.

7. The electronic device of claim 6, wherein the active digital pen sensor surface includes a first projective capacitive PEDOT film with rows of electrodes stacked over a second projective capacitive PEDOT film with columns of electrodes.

8. The electronic device of claim 1, wherein the triangulation includes using a signal from a trace intersection of the active digital pen sensor surface closest to a pen tip touch down location, and signals from other trace intersections surrounding the touch down location.

9. A method, comprising:
generating analog position information with an active digital pen sensor surface that includes a projective capacitive sensor layer with a variance of sheet resistance of less than plus or minus 20 percent;
converting, with a sigma-delta analog-to-digital (A-to-D) converter, the analog position information to digital position information; and
determining, via a controller, a pen position by performing a triangulation based on the digital position information.

10. The method of claim 9, wherein the projective capacitive sensor layer has a variance of sheet resistance of less than plus or minus 5 percent.

11. The method of claim 10, wherein the projective capacitive sensor layer has a sheet resistance of at least an average of 300 ohms/sq.

12. The method of claim 9, wherein the projective capacitive sensor layer is fabricated from poly(3,4-ethylenedioxythiophene) (PEDOT) film.

13. An electronic device, comprising:
an active digital pen projective capacitive sensor surface to generate analog position information, wherein the active digital pen projective capacitive sensor surface includes a projected capacitive sensor fabricated from poly(3,4-ethylenedioxythiophene) (PEDOT) film; and
a controller, including a sigma-delta analog-to-digital (A-to-D) converter, to generate digital pen position information based on the analog position information, and perform a triangulation based on the digital pen position information to determine a pen position, wherein the PEDOT film has a variance of sheet resistance of less than plus or minus 5 percent to help facilitate an accurate determination of the pen position based on the triangulation.

14. The electronic device of claim 13, wherein the electronic device is a display device.

15. The electronic device of claim 13, wherein the electronic device is an indirect inking device.

\* \* \* \* \*